United States Patent
Funayama et al.

(10) Patent No.: US 10,976,739 B2
(45) Date of Patent: Apr. 13, 2021

(54) VEHICLE CONTROL DEVICE

(71) Applicant: TOYOTA JIDOSHA KABUSHIKI KAISHA, Toyota (JP)

(72) Inventors: Ryuji Funayama, Yokohama (JP); Takayuki Iwamoto, Sunto-gun (JP); Sho Otaki, Yokohama (JP); Hojung Jung, Susono (JP); Yasuo Sakaguchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 16/212,099

(22) Filed: Dec. 6, 2018

(65) Prior Publication Data
US 2019/0187710 A1 Jun. 20, 2019

(30) Foreign Application Priority Data
Dec. 18, 2017 (JP) .............................. JP2017-242084

(51) Int. Cl.
*G05D 1/00* (2006.01)
*G05D 1/02* (2020.01)
(Continued)

(52) U.S. Cl.
CPC ........... *G05D 1/0088* (2013.01); *G01C 21/30* (2013.01); *G01C 21/3407* (2013.01);
(Continued)

(58) Field of Classification Search
CPC ............................... G05D 1/0088; G01C 21/30
See application file for complete search history.

(56) References Cited

U.S. PATENT DOCUMENTS 9,268,332 B2 2/2016 Montemerlo et al.
10,740,625 B2 * 8/2020 Satomura ............. G08G 1/0967
(Continued)

FOREIGN PATENT DOCUMENTS

JP 2007-233646 A 9/2007
JP 2015-203876 A 11/2015
(Continued)

*Primary Examiner* — Jess Whittington
(74) *Attorney, Agent, or Firm* — Sughrue Mion, PLLC

(57) ABSTRACT

A vehicle control device includes a traveling environment classification database configured to record traveling environment classification data in which at least one past traveling plan for autonomous driving and a traveling result of the past traveling plan are associated with each other for each preset traveling environment classification, a traveling environment classification determination unit configured to determine whether or not the traveling environment classification corresponding to a traveling environment of a host vehicle is present in the traveling environment classification database when the host vehicle travels in a map non-correspondence region during the autonomous driving, and a traveling plan generation unit configured to generate a mapless traveling plan as a traveling plan of the host vehicle in the map non-correspondence region when the traveling environment classification corresponding to the traveling environment of the host vehicle is present in the traveling environment classification database.

8 Claims, 7 Drawing Sheets

(51) Int. Cl.
  *G01C 21/30* (2006.01)
  *G01C 21/34* (2006.01)
  *G01C 21/36* (2006.01)

(52) U.S. Cl.
  CPC ....... *G01C 21/3602* (2013.01); *G05D 1/0221* (2013.01); *G05D 1/0274* (2013.01); *G05D 2201/0213* (2013.01)

(56) References Cited

U.S. PATENT DOCUMENTS

| | | |
|---|---|---|
| 2009/0024357 A1 | 1/2009 | Aso et al. |
| 2013/0211656 A1* | 8/2013 | An .................. G05D 1/0285 |
| | | 701/25 |
| 2013/0289824 A1* | 10/2013 | Mudalige ............... G08G 1/167 |
| | | 701/41 |
| 2014/0142799 A1 | 5/2014 | Ferguson et al. |
| 2017/0102708 A1 | 4/2017 | Bando et al. |
| 2017/0142799 A1 | 5/2017 | Kashiwakura et al. |
| 2017/0334454 A1* | 11/2017 | Abe .................. G05D 1/0088 |
| 2018/0023692 A1* | 1/2018 | Gauthier ................ F16H 59/44 |
| | | 701/55 |
| 2018/0093676 A1 | 4/2018 | Emura et al. |
| 2018/0105186 A1 | 4/2018 | Motomura et al. |
| 2019/0114493 A1* | 4/2019 | Ewert .................. G05D 1/0246 |
| 2019/0146508 A1* | 5/2019 | Dean ................... G05D 1/0274 |
| | | 701/26 |

FOREIGN PATENT DOCUMENTS

| | | |
|---|---|---|
| JP | 2016-216028 A | 12/2016 |
| JP | 2017-073021 A | 4/2017 |
| JP | 2017204145 A | 11/2017 |
| WO | 2016/170786 A1 | 10/2016 |

\* cited by examiner

Fig.4

| | COURSE PLAN | SPEED PLAN | TRAVELING RESULT (RISK INDEX) |
|---|---|---|---|
| PAST TRAVELING PLAN 1 | P1, Mb | V1 (SPEED vs TIME) | 80 |
| PAST TRAVELING PLAN 2 | P2, Mb | V2 (SPEED vs TIME) | 50 |
| PAST TRAVELING PLAN 3 | P3, Mb | V3 (SPEED vs TIME) | 10 |

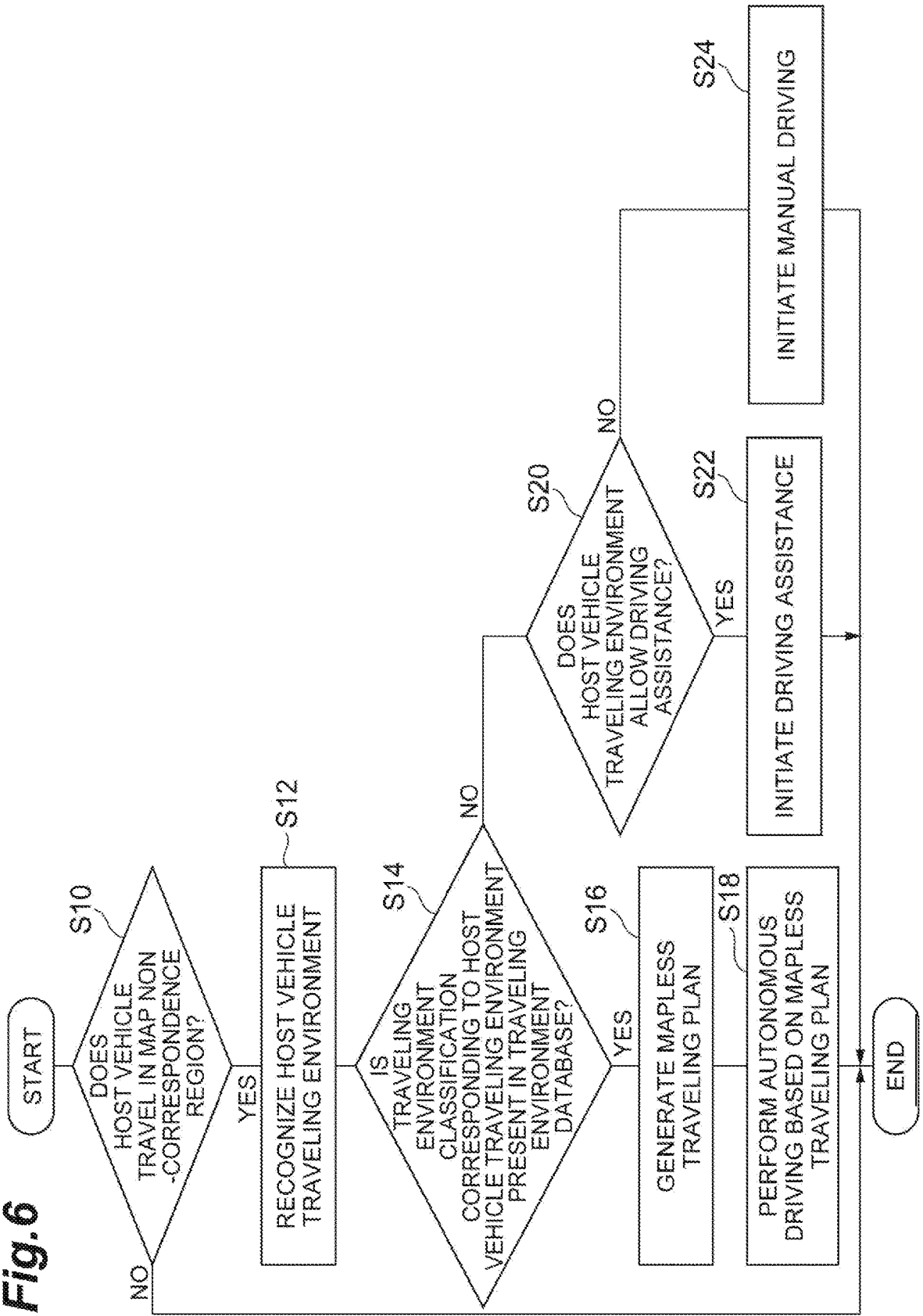

VEHICLE CONTROL DEVICE

TECHNICAL FIELD

The present disclosure relates to a vehicle control device.

BACKGROUND

In the related art, U.S. Pat. No. 9,268,332 is known as a technical document relating to a vehicle control device. In the system that is disclosed in this publication, notification is performed such that part of vehicle control (any of acceleration control, deceleration control, and steering control) is handed over to a driver when a vehicle in an autonomous driving mode approaches a specific zone (zone where autonomous driving cannot be performed with ease). In addition, once the driver takes over the vehicle control in part, the rest of the vehicle control is performed with reference to map information even if the vehicle enters the specific zone.

CROSS-REFERENCE TO RELATED APPLICATION

This application claims the benefit of priority from Japanese Patent Application No. 2017-242084, filed Dec. 18, 2017, the entire contents of which are incorporated herein by reference.

SUMMARY

Autonomous driving map information, which is map information used for the autonomous driving as described above, needs to be more detailed than conventional map information used in driver navigation or the like. However, since the autonomous driving map information does not necessarily correspond to every vehicle traveling region, things need to be considered with regard to autonomous driving of the vehicle traveling in regions to which the autonomous driving map information does not correspond.

Desired in this technical field in this regard is a vehicle control device capable of appropriately executing autonomous driving in a map non-correspondence region to which autonomous driving map information does not correspond.

An aspect of the present disclosure for solving the above problem relates to a vehicle control device configured to execute autonomous driving of a host vehicle based on autonomous driving map information. The vehicle control device includes a map non-correspondence region recognition unit configured to recognize a map non-correspondence region to which the autonomous driving map information does not correspond, a traveling environment recognition unit configured to recognize a traveling environment of the host vehicle based on a detection result of an in-vehicle sensor of the host vehicle, a traveling environment classification database configured to record traveling environment classification data in which at least one past traveling plan for the autonomous driving and a traveling result of the past traveling plan are associated with each other for each preset traveling environment classification, a traveling environment classification determination unit configured to determine whether or not the traveling environment classification corresponding to the traveling environment of the host vehicle recognized by the traveling environment recognition unit is present in the traveling environment classification database when the host vehicle travels in the map non-correspondence region during the autonomous driving, a traveling plan generation unit configured to generate a mapless traveling plan as a traveling plan of the host vehicle in the map non-correspondence region based on the past traveling plan associated with the traveling environment classification and the traveling result of the past traveling plan when the traveling environment classification determination unit determines that the traveling environment classification corresponding to the traveling environment of the host vehicle is present in the traveling environment classification database, and a vehicle control unit configured to perform the autonomous driving of the host vehicle based on the mapless traveling plan.

In the vehicle control device according to the aspect of the present disclosure, the mapless traveling plan can be generated based on the past traveling plan associated with the traveling environment classification and the traveling result of the past traveling plan and the autonomous driving of the vehicle can be performed based on the mapless traveling plan when the host vehicle travels in the map non-correspondence region during the autonomous driving and it is determined that the traveling environment classification corresponding to the traveling environment of the host vehicle is present in the traveling environment classification database. Accordingly, the vehicle control device is capable of appropriately executing the autonomous host vehicle driving in the map non-correspondence region to which the autonomous driving map information does not correspond by using the past traveling plan associated with the traveling environment classification corresponding to the traveling environment of the host vehicle and the traveling result of the past traveling plan.

In the vehicle control device according to the aspect of the present disclosure, the traveling result of the past traveling plan may include a risk index and the traveling plan generation unit may be configured to generate, when a plurality of the past traveling plans associated with the traveling environment classification corresponding to the traveling environment of the host vehicle are present, the mapless traveling plan based on the past traveling plan with a lowest risk index among the plurality of past traveling plans.

When a plurality of the past traveling plans are present that are associated with the traveling environment classification corresponding to the traveling environment of the host vehicle, the vehicle control device is capable of generating the mapless traveling plan based on the past traveling plan with the lowest risk index among the plurality of past traveling plans, and thus the vehicle control device is advantageous for autonomous driving risk reduction for the host vehicle in the map non-correspondence region.

In the vehicle control device according to the aspect of the present disclosure, the vehicle control unit may be configured to terminate the autonomous driving of the host vehicle and initiate driving assistance or manual driving of the host vehicle when the host vehicle travels in the map non-correspondence region during the autonomous driving and the traveling environment classification determination unit determines that the traveling environment classification corresponding to the traveling environment of the host vehicle is not present.

When the host vehicle travels in the map non-correspondence region during the autonomous driving and it is determined that the traveling environment classification corresponding to the host vehicle traveling environment is not present in the traveling environment classification database, the vehicle control device is capable of terminating the autonomous driving of the host vehicle and switching to the driving assistance or the manual driving for the host vehicle.

The vehicle control device according to the aspect of the present disclosure may further include a recording unit configured to record the mapless traveling plan in the traveling environment classification database as the past traveling plan concerning the traveling environment classification used for the generation of the mapless traveling plan and record a traveling result of the mapless traveling plan in the traveling environment classification database as the traveling result of the past traveling plan when the autonomous driving of the host vehicle is performed based on the mapless traveling plan.

The vehicle control device records the mapless traveling plan and the traveling result of the mapless traveling plan in the traveling environment classification database during mapless traveling plan-based autonomous host vehicle driving, and thus the traveling environment classification database can be enriched.

As described above, according to the aspect of the present disclosure, the autonomous driving can be appropriately executed in the map non-correspondence region to which the autonomous driving map information does not correspond.

BRIEF DESCRIPTION OF THE DRAWINGS

FIG. 4 is a table illustrating the relationship between a past traveling plan and a traveling result.

FIG. 6 is a flowchart illustrating an instance of autonomous driving processing.

DETAILED DESCRIPTION

Hereinafter, an example of the present disclosure will be described with reference to accompanying drawings.

Figure 1:
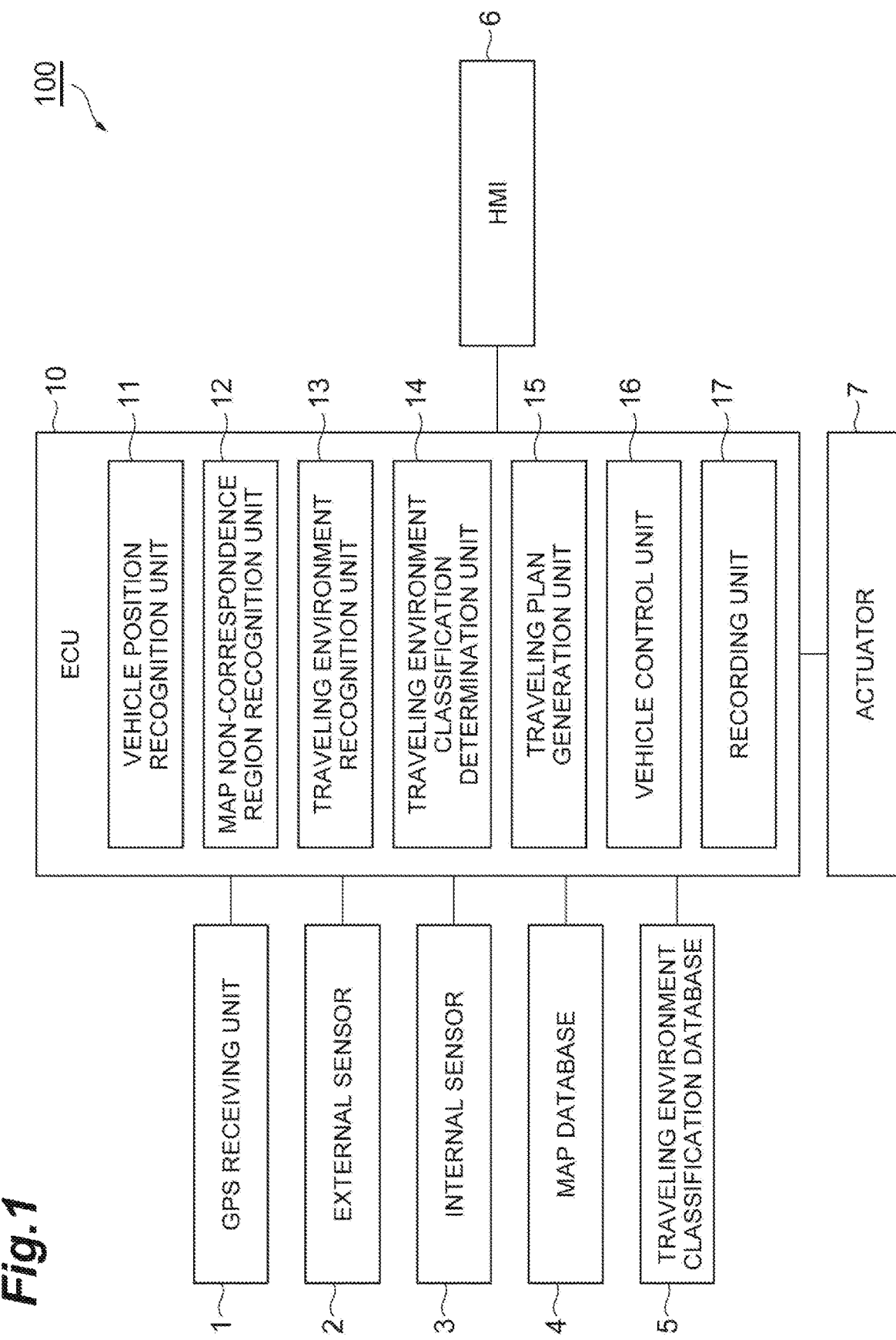
FIG. 1 is a block diagram illustrating a vehicle control device according to an example.

A vehicle control device 100 illustrated in FIG. 1 is mounted in a vehicle (host vehicle) such as a passenger car and controls traveling of the host vehicle. The vehicle control device 100 switches the driving state of the host vehicle between autonomous driving and manual driving.

The autonomous driving is, for instance, a driving state in which the vehicle automatically performs traveling along a road on which the host vehicle travels. The autonomous driving includes, for instance, a driving state in which the host vehicle automatically performs traveling toward a preset destination with a driver performing no driving operation. The manual driving is a driving state in which the vehicle travels mainly by a driving operation by a driver. The vehicle control device 100 has a function to execute driving assistance for supporting driving led by a driving operation by a driver. The driving assistance includes adaptive cruise control [ACC], lane keeping assist [LKA], and the like.

The vehicle control device 100 executes the autonomous driving based on autonomous driving map information. The autonomous driving map information will be described later. When the host vehicle travels in a map non-correspondence region not corresponding to the autonomous driving map information during the autonomous driving, the vehicle control device 100 executes (continues with) the autonomous driving by using traveling environment classification data stored in a traveling environment classification database 5 (described later).

Configuration of Vehicle Control Device

As illustrated in FIG. 1, the vehicle control device 100 is provided with an electronic control unit [ECU] 10 comprehensively managing the device. The ECU 10 is an electronic control unit that has a central processing unit [CPU], a read only memory [ROM], a random access memory [RAM], and the like. The ECU 10 realizes various functions by, for instance, loading a program stored in the ROM into the RAM and executing the program loaded into the RAM with the CPU. A plurality of electronic units may constitute the ECU 10 as well.

A GPS receiving unit 1, an external sensor 2, an internal sensor 3, a map database 4, the traveling environment classification database 5, a human machine interface [HMI] 6, and an actuator 7 are connected to the ECU 10.

The GPS receiving unit 1 measures the position of the host vehicle (such as the latitude and the longitude of the host vehicle) by receiving signals from at least three GPS satellites. The GPS receiving unit 1 transmits measured positional information regarding the host vehicle to the ECU 10.

The external sensor 2 is an in-vehicle sensor detecting a situation around the host vehicle. The external sensor 2 includes at least one of a camera and a radar sensor.

The camera is imaging equipment imaging the external environment around the host vehicle. The camera is disposed on the back side of the windshield of the host vehicle or the like. The camera transmits imaging information related to the external environment regarding the host vehicle to the ECU 10. A plurality of the cameras may be disposed as well. The camera may be a monocular camera or may be a stereo camera.

The radar sensor is detection equipment detecting obstacles around the host vehicle by using radio waves (such as millimeter waves) or light. The radar sensor includes, for instance, a millimeter wave radar device or a light detection and ranging [LIDAR] device. The radar sensor detects the obstacles by transmitting the radio waves or the light to the surroundings of the host vehicle and receiving the radio waves or the light reflected by the obstacles. The radar sensor transmits detected obstacle information to the ECU 10. The obstacles include moving obstacles such as pedestrians, bicycles, and non-host vehicles as well as stationary obstacles such as trees and buildings.

The internal sensor 3 is an in-vehicle sensor detecting the traveling state of the host vehicle. The internal sensor 3 includes a vehicle speed sensor, an acceleration sensor, and a yaw rate sensor. The vehicle speed sensor is a detector that detects the speed of the host vehicle. A vehicle wheel speed sensor that is disposed with respect to a vehicle wheel of the host vehicle, a drive shaft rotating integrally with the vehicle wheel, or the like and detects the rotation speed of the vehicle wheel is used as the vehicle speed sensor. The vehicle speed sensor transmits detected vehicle speed information (vehicle wheel speed information) to the ECU 10.

The acceleration sensor is a detector that detects the acceleration of the host vehicle. The acceleration sensor includes, for instance, a longitudinal acceleration sensor detecting the acceleration of the host vehicle in a longitudinal direction and a lateral acceleration sensor detecting the lateral acceleration of the host vehicle. The acceleration sensor transmits, for instance, acceleration information regarding the host vehicle to the ECU 10. The yaw rate sensor is a detector that detects the yaw rate (rotation angular velocity) around the vertical axis of the center of gravity of the host vehicle. A gyro sensor or the like can be used as the yaw rate sensor. The yaw rate sensor transmits detected yaw rate information regarding the host vehicle to the ECU 10.

The map database 4 is a database in which the autonomous driving map information is stored. The map database 4 is formed within, for instance, a hard disk drive [HDD] that is mounted in the host vehicle. The autonomous driving map information is detailed map information used for the autonomous driving of the host vehicle. The autonomous driving map information includes, for instance, positional information regarding lanes, the shapes of the lanes (such as curvatures), and positional information regarding intersection points.

Also included in the autonomous driving map information is positional information regarding targets usable for estimating the position of the host vehicle. The targets are, for instance, poles, temporary stop lines, and so on. The targets may also include, for instance, white lines such as lane boundary lines and road center lines and curbs disposed along roads. Traffic signals also may be included in the targets. The autonomous driving map information may also include traffic regulation information such as a legal speed associated with positional information and positional information regarding stationary obstacles such as trees and buildings. The map database 4 may be formed in a server capable of communicating with the host vehicle.

The traveling environment classification database 5 is a database in which the traveling environment classification data is stored. The traveling environment classification data is data in which at least one past traveling plan for the autonomous driving and the traveling result of the past traveling plan are associated with each other for each preset traveling environment classification. The traveling environment classification data is used for executing the autonomous host vehicle driving in the map non-correspondence region not corresponding to the autonomous driving map information.

The traveling environment classification is a preset vehicle traveling environment classification. The vehicle in the traveling environment classification data may be a past host vehicle or may be a vehicle other than the host vehicle. The traveling environment of the vehicle is an environment including the external environment regarding the vehicle and the traveling state of the vehicle.

The external environment regarding the vehicle includes, for instance, a situation regarding the lane in which the vehicle travels and a situation regarding an obstacle around the vehicle. The lane situation includes the curve of the lane. The lane situation may also include a lane width. The lane situation may also include distinction between single- and multi-lane roads. The obstacle situation includes a situation regarding a moving obstacle such as a non-host vehicle and a pedestrian and a situation regarding a stationary obstacle such as an electric pole. The moving obstacle situation includes, for instance, the relative position of a moving obstacle with respect to the vehicle, the relative speed of a moving obstacle with respect to the vehicle, and the progress direction of a moving obstacle with respect to the vehicle. The stationary obstacle situation includes, for instance, the relative position of a stationary obstacle with respect to the vehicle.

The traveling state of the vehicle includes the speed of the vehicle and the yaw rate of the vehicle. The traveling state of the vehicle may also include the acceleration (longitudinal acceleration, lateral acceleration) of the vehicle and jerking of the vehicle.

The traveling environment classification may be classified in view of traveling scenes. The traveling scenes include various scenes such as an interruption scene in which a non-host vehicle from an adjacent lane cuts in between the vehicle and a preceding vehicle, a lane change scene in which the vehicle moves to an adjacent lane, and an intersection point right turn scene in which the vehicle turns right at an intersection point. The traveling environment classification can vary with the external environment or the traveling state of the vehicle even in the same traveling scene.

The past traveling plan for the autonomous driving is, for instance, a traveling plan used in past autonomous driving. The past traveling plan includes a past course plan and a past speed plan. The course plan is a plan regarding the course of the vehicle in autonomous driving. The speed plan is a plan regarding the speed (vehicle speed) of the vehicle. The speed plan can be data on a target vehicle speed depending on time (or the position of the vehicle). The speed plan may also be target acceleration data. The past traveling plan is stored in association with the traveling environment classification. One or more past traveling plans are associated with one traveling environment classification.

The traveling result of the past traveling plan is, for instance, the result of past traveling plan-based autonomous driving execution. The traveling result of the past traveling plan is stored in association with each past traveling plan. The traveling result of the past traveling plan includes a risk index. The risk index is an index of the risk of the vehicle resulting from past traveling plan-based autonomous driving.

The risk index can have, for instance, a value increasing as a closest approach distance decreases. The closest approach distance is the distance at which the vehicle and an obstacle (such as a non-host vehicle) are closest to each other during past traveling plan-based autonomous driving execution. The value of the risk index may be higher when the closest approach distance is less than a preset distance threshold than when the closest approach distance is equal to or greater than the distance. The risk index may be calculated from the time to collision [TTC] between the vehicle and the obstacle instead of the closest approach distance. The risk index may be calculated from a time headway [THW] as well. The risk index may be a two-stage index divided into the presence and absence of a risk and may also be an index that has three or more stages and uses "x", "Δ", "o", and the like.

The HMI 6 is an interface for information input and output between the vehicle control device 100 and an occupant. The HMI 6 includes, for instance, a display and a speaker. The HMI 6 performs image output on the display and audio output from the speaker in accordance with a control signal from the ECU 10.

The actuator 7 is a device that is used for host vehicle control. The actuator 7 includes at least a drive actuator, a brake actuator, and a steering actuator. The drive actuator controls the drive force of the host vehicle by controlling the amount of air supply to an engine (throttle opening degree) in accordance with a control signal from the ECU 10. When the host vehicle is a hybrid vehicle, the drive force is controlled by a control signal from the ECU 10 being input to a motor as a power source as well as by means of the amount of air supply to an engine. When the host vehicle is an electric vehicle, the drive force is controlled by a control signal from the ECU 10 being input to a motor as a power source. The motors as a power source in these cases constitute the actuator 7.

The brake actuator controls a brake system in accordance with a control signal from the ECU 10 and controls a braking force given to the vehicle wheel of the host vehicle. A hydraulic brake system or the like can be used as the brake system. The steering actuator controls, in accordance with a control signal from the ECU 10, driving of an assist motor that controls a steering torque in an electric power steering system. In this manner, the steering actuator controls the steering torque of the host vehicle.

The functional configuration of the ECU 10 will be described below. As illustrated in FIG. 1, the ECU 10 has a vehicle position recognition unit 11, a map non-correspondence region recognition unit 12, a traveling environment recognition unit 13, a traveling environment classification determination unit 14, a traveling plan generation unit 15, a vehicle control unit 16, and a recording unit 17. Some of the functions of the ECU 10 to be described below may be formed in a server capable of communicating with the host vehicle.

The vehicle position recognition unit 11 recognizes the position of the host vehicle on a map based on the positional information of the GPS receiving unit 1 and the autonomous driving map information of the map database 4. In addition, the vehicle position recognition unit 11 accurately recognizes the position of the host vehicle with simultaneous localization and mapping [SLAM] technology or the like by using the detection result of the external sensor 2 and the positional information regarding a target included in the autonomous driving map information of the map database 4. Alternatively, the vehicle position recognition unit 11 may recognize the position of the host vehicle on the map by a known method.

The map non-correspondence region recognition unit 12 recognizes the map non-correspondence region to which the autonomous driving map information stored in the map database 4 does not correspond. The map non-correspondence region to which the autonomous driving map information does not correspond means a region (or a section) on the map not including information that should be included in the autonomous driving map information for the autonomous host vehicle driving to be appropriately executed. In the map non-correspondence region, at least one of road lane-specific positional information and target-related positional information is not included in the autonomous driving map information of the map database 4. The information that should be included in the autonomous driving map information for the autonomous host vehicle driving to be appropriately executed may be added depending on the autonomous driving function of the host vehicle.

Based on the autonomous driving map information of the map database 4 and the position of the host vehicle on the map recognized by the vehicle position recognition unit 11, the map non-correspondence region recognition unit 12 determines whether or not the host vehicle travels in the map non-correspondence region. The map non-correspondence region recognition unit 12 may determine in advance whether or not the host vehicle travels in the map non-correspondence region based on a target route on which the host vehicle travels during the autonomous driving and the autonomous driving map information.

The traveling environment recognition unit 13 recognizes the traveling environment of the host vehicle based on the detection results of the external sensor 2 and the internal sensor 3 (in-vehicle sensor detection results). The traveling environment of the host vehicle includes the external environment of the host vehicle and the traveling state of the host vehicle. Based on the detection result of the external sensor 2, the traveling environment recognition unit 13 recognizes the external environment of the host vehicle including a situation of an obstacle around the host vehicle. The traveling environment recognition unit 13 may recognize a white line around the host vehicle based on the detection result of the external sensor 2 and may recognize the result of the white line recognition as an external environment. Based on the detection result of the internal sensor 3, the traveling environment recognition unit 13 recognizes the traveling state of the host vehicle such as the vehicle speed, the acceleration, and the yaw rate.

Figure 2:
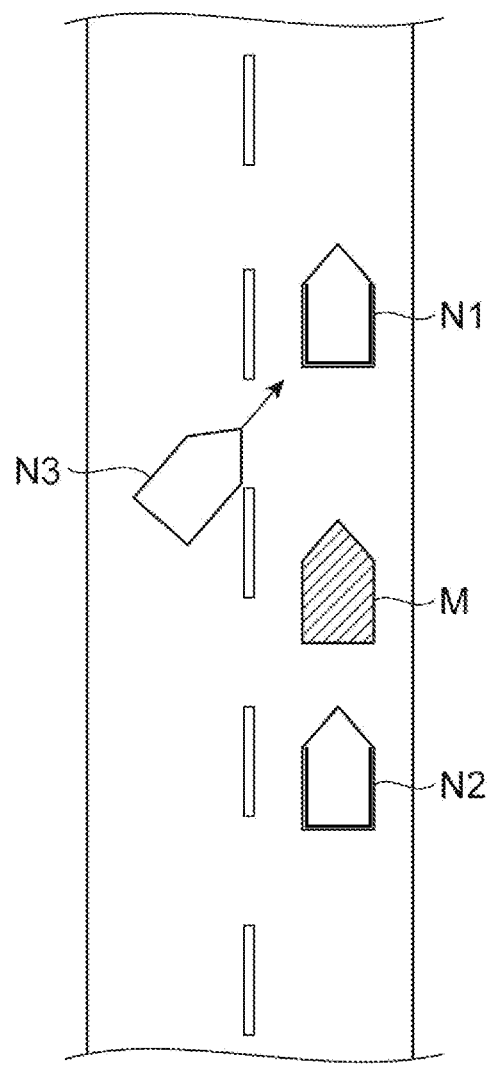
FIG. 2 is a plan view illustrating an instance of a host vehicle traveling environment.

FIG. 2 is a plan view illustrating an instance of the traveling environment of the host vehicle. Illustrated in FIG. 2 are a host vehicle M, a preceding vehicle N1, a following vehicle N2, and an interrupting vehicle N3. FIG. 2 illustrates an instance of the interruption scene in which the interrupting vehicle N3 cuts in between the host vehicle M and the preceding vehicle N1. Based on the detection results of the external sensor 2 and the internal sensor 3, the traveling environment recognition unit 13 recognizes the traveling environment of the host vehicle illustrated in FIG. 2.

When the host vehicle travels in the map non-correspondence region during the autonomous driving, the traveling environment classification determination unit 14 determines whether or not the traveling environment classification corresponding to the traveling environment of the host vehicle is present in the traveling environment classification database based on the traveling environment classification data of the traveling environment classification database 5 and the traveling environment of the host vehicle recognized by the traveling environment recognition unit 13.

The traveling environment classification corresponding to the traveling environment of the host vehicle is a traveling environment classification that is associated with a past traveling plan which is useful in generating a traveling plan for autonomous driving in the traveling environment of the host vehicle. For instance, the traveling environment classification determination unit 14 determines whether or not the traveling environment classification corresponding to the traveling environment of the host vehicle is present in the traveling environment classification database 5 by comparing the traveling environment of the host vehicle to a representative traveling environment set in advance for each traveling environment classification. The representative traveling environment is a representative traveling environment in the traveling environment classification. Here, it is assumed that the representative traveling environment for each traveling environment classification is stored in the traveling environment classification database 5.

The traveling environment classification determination unit 14 determines that the traveling environment classification corresponding to the traveling environment of the host vehicle is present in the traveling environment classification database 5 when, for instance, a representative traveling environment is present in which the size of the inner product of the feature vector of the traveling environment of the host vehicle and the feature vector of the representative traveling environment stored in advance is equal to or greater than a set threshold. The set threshold is a preset threshold.

The traveling environment classification determination unit 14 generates a feature vector by extraction as a feature quantity from the traveling environment of the host vehicle. The feature quantity can be adopted from, for instance, the vehicle speed of the host vehicle, the yaw rate of the host vehicle, the inter-vehicle distance between the host vehicle and the preceding vehicle, the vehicle speed of the preceding vehicle, and the relative position of the non-host vehicle that is closest to the host vehicle. For instance, the traveling environment classification determination unit 14 generates the feature vector of the traveling environment of the host vehicle by extracting the vehicle speed of the host vehicle as the first element, the speed of the non-host vehicle closest to the host vehicle as the second element, the inter-vehicle distance between the host vehicle and the preceding vehicle as the third element, and so on. Since the size of the inner product of the feature vector of the traveling environment of the host vehicle and the feature vector of the representative traveling environment approaches 1 as the degree of similarity between the traveling environment of the host vehicle and the representative traveling environment increases, the traveling environment classification determination unit 14 is capable of making the above determination based on the size of the inner product of the feature vectors.

Alternatively, the traveling environment classification determination unit 14 may determine that the traveling environment classification corresponding to the traveling environment of the host vehicle is present in the traveling environment classification database 5 when a representative traveling environment that has a difference from the host vehicle traveling environment which is within an allowable range is present. The allowable range is a preset range. The allowable range may be set for each feature quantity of the traveling environment.

The traveling environment classification determination unit 14 determines that the traveling environment classification corresponding to the traveling environment of the host vehicle is present in the traveling environment classification database 5 when, for instance, the only difference between the traveling environment of the host vehicle and the representative traveling environment is the vehicle speed of the host vehicle and a representative traveling environment in which the difference in vehicle speed is within an allowable range (such as ±10 km/h) is present. Also, the traveling environment classification determination unit 14 may determine that the traveling environment classification corresponding to the traveling environment of the host vehicle is present in the traveling environment classification database 5 when the only differences between the traveling environment of the host vehicle and the representative traveling environment are the vehicle speed of the host vehicle and the inter-vehicle distance between the host vehicle and the preceding vehicle and a representative traveling environment in which the difference in vehicle speed is within an allowable range and the difference in inter-vehicle distance is within an allowable range (such as ±0.5 m) is present. Still, methods for the determination by the traveling environment classification determination unit 14 are not limited to the content described above. The traveling environment classification determination unit 14 is capable of adopting various methods for inter-traveling environment similarity determination.

In this example, the traveling environment classification determination unit 14 has, as a determination object, a traveling environment classification associated with a past traveling plan in which the risk index of the traveling result is less than a determination object threshold. In other words, the traveling environment classification determination unit 14 does not have as a determination object a traveling environment classification associated only with a past traveling plan in which the risk index of the traveling result is equal to or greater than the determination object threshold. The determination object threshold is a preset threshold. When only the past traveling plan with a risk index equal to or greater than the determination object threshold is associated with the traveling environment classification of the representative traveling environment, the traveling environment classification determination unit 14 does not determine the traveling environment classification as the traveling environment classification corresponding to the traveling environment of the host vehicle even if a representative traveling environment is present in which the size of the inner product of the feature vector of the traveling environment of the host vehicle and the feature vector of the representative traveling environment is equal to or greater than the set threshold. The risk index of the traveling result does not have to be stored in the traveling environment classification database 5 and is the same also when the traveling environment classification determination unit 14 calculates the risk index from the traveling result.

Figure 3C:
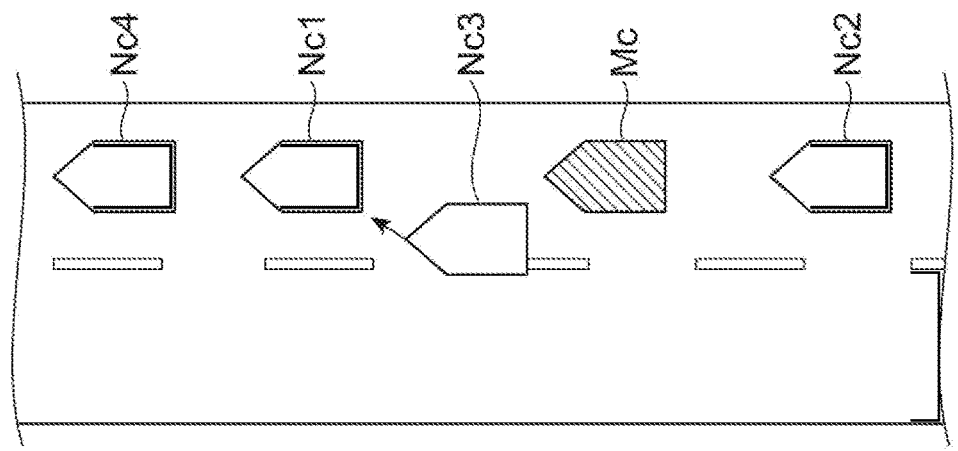
FIG. 3C is a plan view illustrating a representative traveling environment Rc of a third traveling environment classification.

Next, the content of the determination by the traveling environment classification determination unit 14 will be described in detail with reference to FIGS. 3A to 3C. FIG. 3A is a plan view illustrating a representative traveling environment Ra of a first traveling environment classification. The first traveling environment classification and the representative traveling environment Ra are stored in the traveling environment classification database 5. FIG. 3A illustrates a reference vehicle Ma corresponding to the host vehicle, a preceding vehicle Na1, a following vehicle Na2, and an interrupting vehicle Na3. The representative traveling environment Ra illustrated in FIG. 3A represents an interruption scene in which the interrupting vehicle Na3 cut in between the reference vehicle Ma and the preceding vehicle Na1 in the past. Comparing the traveling environment of the host vehicle illustrated in FIG. 2 to the representative traveling environment Ra illustrated in FIG. 3A, in the representative traveling environment Ra, the interrupting vehicle Na3 is yet to cut in and the interrupting vehicle Na3 has a different position and a different direction. The traveling state such as the vehicle speed of the host vehicle M is the same as the traveling state of the reference vehicle Ma.

The traveling environment classification determination unit 14 determines that the first traveling environment classification illustrated in FIG. 3A does not correspond to the traveling environment of the host vehicle illustrated in FIG. 2 since, for instance, the difference between the traveling environment of the host vehicle illustrated in FIG. 2 and the representative traveling environment Ra illustrated in FIG. 3A is large (for instance, the difference exceeds an allowable range).

Figure 3B:
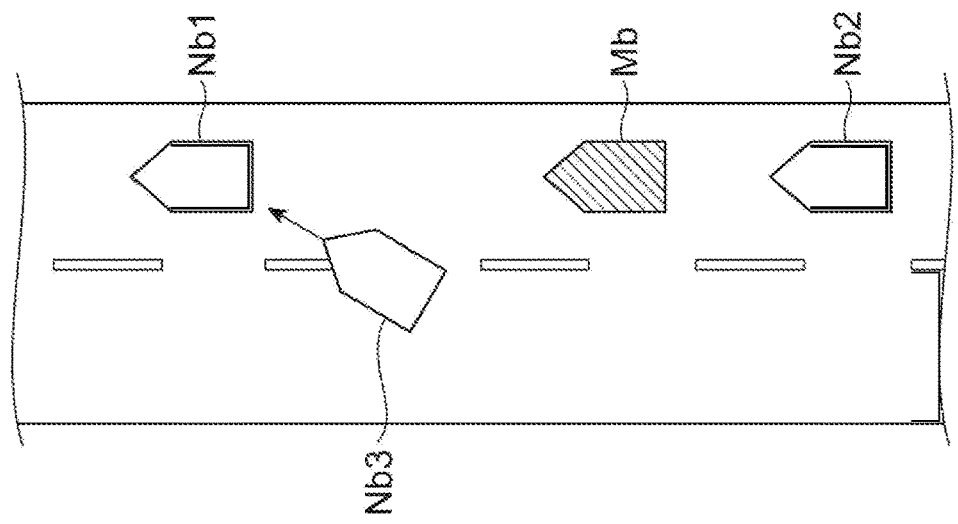
FIG. 3B is a plan view illustrating a representative traveling environment Rb of a second traveling environment classification.
Figure 3A:
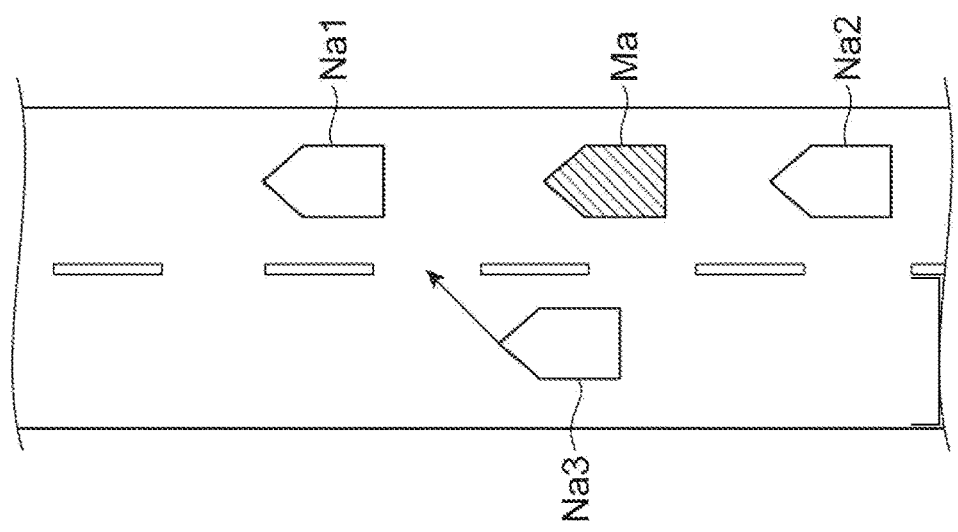
FIG. 3A is a plan view illustrating a representative traveling environment Ra of a first traveling environment classification.

FIG. 3B is a plan view illustrating a representative traveling environment Rb of a second traveling environment classification. The second traveling environment classification and the representative traveling environment Rb are stored in the traveling environment classification database 5. FIG. 3B illustrates a reference vehicle Mb corresponding to the host vehicle, a preceding vehicle Nb1, a following vehicle Nb2, and an interrupting vehicle Nb3. Comparing the traveling environment of the host vehicle illustrated in FIG. 2 to the representative traveling environment Rb illustrated in FIG. 3B, in the representative traveling environment Rb, the only differences are the inter-vehicle distance between the reference vehicle Mb and the preceding vehicle Nb1 and the position of the interrupting vehicle Na3.

The traveling environment classification determination unit 14 determines that the second traveling environment classification illustrated in FIG. 3B corresponds to the traveling environment of the host vehicle illustrated in FIG. 2 since the difference between the traveling environment of the host vehicle illustrated in FIG. 2 and the representative traveling environment Rb illustrated in FIG. 3B is small (for instance, the difference is within an allowable range).

FIG. 3C is a plan view illustrating a representative traveling environment Rc of a third traveling environment classification. The third traveling environment classification and the representative traveling environment Rc are stored in the traveling environment classification database 5. FIG. 3C illustrates a reference vehicle Mc corresponding to the host vehicle, a preceding vehicle Nc1, a following vehicle Nc2, an interrupting vehicle Nc3, and a preceding vehicle Nc4 ahead of the preceding vehicle Nc1. Comparing the traveling environment of the host vehicle illustrated in FIG. 2 to the representative traveling environment Rc illustrated in FIG. 3C, in the representative traveling environment Rc, the only differences are that the interrupting vehicle Nc3 already cut in between the reference vehicle Mc and the preceding vehicle Nc1 and that the preceding vehicle Nc4 ahead of the preceding vehicle Nc1 is present.

The traveling environment classification determination unit 14 determines that the third traveling environment classification illustrated in FIG. 3C does not correspond to the traveling environment of the host vehicle illustrated in FIG. 2 since the difference between the traveling environment of the host vehicle illustrated in FIG. 2 and the representative traveling environment Rc illustrated in FIG. 3C is large. Still, the traveling environment classification determination unit 14 may make the above determination without considering the presence of the preceding vehicle Nc4 ahead of the preceding vehicle Nc1 when it can be determined that the presence or absence of the preceding vehicle Nc4 ahead of the preceding vehicle Nc1 has no effect from the viewpoint of traveling plan generation. The same applies to the following vehicle.

In this manner, the traveling environment classification determination unit 14 determines that the second traveling environment classification corresponding to the traveling environment of the host vehicle illustrated in FIG. 2 is present in the traveling environment classification database 5 when the traveling environment recognition unit 13 recognizes the traveling environment of the host vehicle illustrated in FIG. 2 and the first traveling environment classification illustrated in FIG. 3A, the second traveling environment classification illustrated in FIG. 3B, and the third traveling environment classification illustrated in FIG. 3C are stored in the traveling environment classification database 5. The determination result described above is an instance, and the traveling environment classification determination unit 14 may also determine that the first traveling environment classification and/or the third traveling environment classification also corresponds to the traveling environment of the host vehicle illustrated in FIG. 2.

The traveling plan generation unit 15 generates a host vehicle traveling plan used for autonomous driving. When the host vehicle travels in a region corresponding to the autonomous driving map information (when the host vehicle does not travel in the map non-correspondence region), the traveling plan generation unit 15 generates the host vehicle traveling plan based on a preset autonomous driving target route, the autonomous driving map information of the map database 4, the position of the host vehicle on the map recognized by the vehicle position recognition unit 11, and the host vehicle traveling environment recognized by the traveling environment recognition unit 13.

The traveling plan includes, for instance, a vehicle control target value depending on the vehicle position on a target route. The position on the target route is a position on the map in the extension direction of the target route. The position on the target route means a set vertical position set at predetermined intervals (such as 1 m) in the extension direction of the target route. The control target value is a value that is a vehicle control target in the traveling plan. The control target value is set in association with each set vertical position on the target route. The traveling plan generation unit 15 generates the traveling plan by setting the set vertical position at predetermined intervals on the target route and setting the control target value (such as a target lateral position and a target vehicle speed) for each set vertical position. The set vertical position and the target lateral position may be set together as a single position coordinate. The set vertical position and the target lateral position mean vertical position information and lateral position information set as targets in the traveling plan. The traveling plan for autonomous driving is not limited to the above and various plans can be adopted.

The traveling plan generation unit 15 generates a mapless traveling plan when the host vehicle travels in the map non-correspondence region during the autonomous driving and the traveling environment classification determination unit 14 determines that the traveling environment classification corresponding to the traveling environment of the host vehicle is present in the traveling environment classification database 5. The mapless traveling plan is a traveling plan generated without the autonomous driving map information being used. The mapless traveling plan can have the same control content as the traveling plan described above.

When the traveling environment classification determination unit 14 determines that a plurality of the traveling environment classifications corresponding to the traveling environment of the host vehicle are present, the traveling plan generation unit 15 may generate the mapless traveling plan based on all of the past traveling plans respectively associated with the plurality of traveling environment classifications and the outcome of the past traveling plans.

For instance, the traveling plan generation unit 15 generates, as the mapless traveling plan for the autonomous driving of the host vehicle, a past traveling plan associated with the traveling environment classification corresponding to the traveling environment of the host vehicle. The traveling plan generation unit 15 generates, as the mapless traveling plan, a past traveling plan in which the risk index of the traveling result is less than the determination object threshold among the past traveling plans associated with the traveling environment classification corresponding to the traveling environment of the host vehicle. When a plurality of the past traveling plans are present in which the risk index of the traveling result is less than the determination object threshold, the traveling plan generation unit 15 generates the past traveling plan with the lowest risk index as the mapless traveling plan.

Here, FIG. 4 is a table illustrating the relationship between the past traveling plan and the traveling result. The past traveling plans 1 to 3 illustrated in FIG. 4 are past traveling plans associated with the second traveling environment classification (see FIG. 3B) determined by the traveling environment classification determination unit 14 to correspond to the traveling environment of the host vehicle illustrated in FIG. 2.

The past traveling plans 1 to 3 are, for instance, traveling plans actually performed by the reference vehicle Mb that reached the representative traveling environment Rb illustrated in FIG. 3B or an approximate traveling environment in the past. The past traveling plans 1 to 3 are associated with traveling results (risk indices) at a time when the past traveling plans 1 to 3 are executed, respectively. The reference vehicles Mb of the past traveling plans 1 to 3 do not have to be the same vehicle.

As illustrated in FIG. 4, the past traveling plan 1 includes a course plan having a course P1 for bringing the reference vehicle Mb closer to the left side (interrupting vehicle Mb3 side) and a speed plan having a speed time change V1 for performing rapid deceleration after maintaining the speed. In addition, the risk index as the traveling result of the past traveling plan 1 is 80. Here, the upper limit of the risk index is 100. In the traveling result of the past traveling plan 1, the risk index has a high value since the reference vehicle Mb executing the past traveling plan 1 and the interrupting vehicle Na3 are excessively close to each other.

The past traveling plan 2 includes a course plan having a course P2 for straightly advancing the reference vehicle Mb and a speed plan having a speed time change V2 for performing deceleration after maintaining the speed. The speed time change V2 has a shorter speed-maintaining time than the speed time change V1. The risk index as the traveling result of the past traveling plan 2 is 50. In the traveling result of the past traveling plan 2, the risk index has a medium value since the reference vehicle Mb executing the past traveling plan 2 and the interrupting vehicle Na3 are temporarily close to each other.

The past traveling plan 3 includes a course plan having a course P3 for bringing the reference vehicle Mb closer to the right side (side away from the interrupting vehicle Na3) and a speed plan having a speed time change V3 for immediately initiating deceleration. The risk index as the traveling result of the past traveling plan 3 is 10. In the traveling result of the past traveling plan 3, the risk index has a low value since the reference vehicle Mb executing the past traveling plan 3 and the interrupting vehicle Na3 maintain a sufficient interval.

The traveling plan generation unit 15 generates the mapless traveling plan of the host vehicle based on the past traveling plans 1 to 3 associated with the second traveling environment classification corresponding to the traveling environment of the host vehicle and the traveling results of the past traveling plans 1 to 3.

Figure 5A:
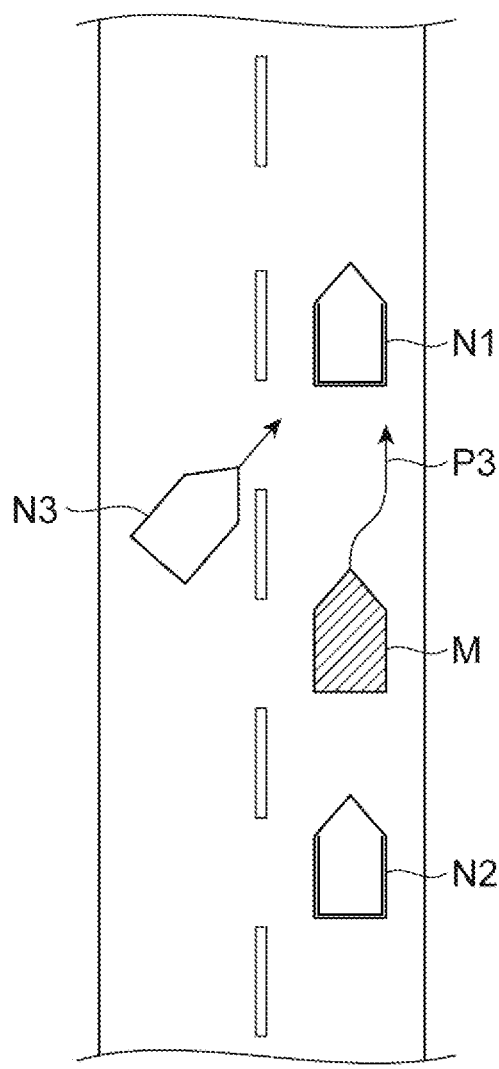
FIG. 5A is a plan view illustrating an instance of a course plan of a mapless traveling plan.

For instance, the traveling plan generation unit 15 generates the past traveling plan 3, which has the lowest risk index, as the mapless traveling plan. Here, FIG. 5A is a plan view illustrating an instance of the course plan of the mapless traveling plan. As illustrated in FIG. 5A, the traveling plan generation unit 15 adopts the course P3 in the course plan of the past traveling plan 3 as the course of the host vehicle in the course plan of the mapless traveling plan.

Figure 5B:
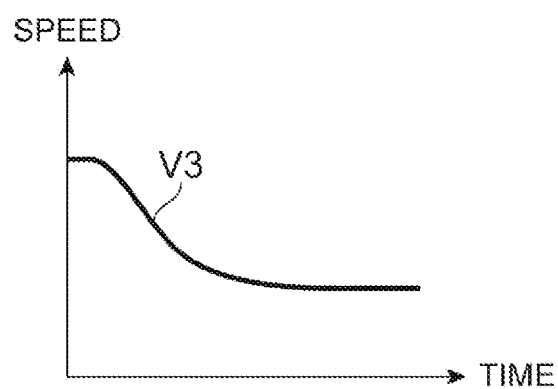
FIG. 5B is a plan view illustrating an instance of a speed plan of the mapless traveling plan.

FIG. 5B is a plan view illustrating an instance of the speed plan of the mapless traveling plan. As illustrated in FIG. 5B, the traveling plan generation unit 15 adopts the speed time change V3 in the speed plan of the past traveling plan 3 as the speed time change of the host vehicle in the speed plan of the mapless traveling plan.

As a result, the traveling plan generation unit 15 is capable of generating the mapless traveling plan for a low-risk traveling result by using the traveling result and the past traveling plan stored in the traveling environment classification database 5 in the map non-correspondence region to which the autonomous driving map information does not correspond. The traveling plan generation unit 15 may perform preset correction processing in accordance with a difference in vehicle type, a difference in autonomous driving system version, or the like when adopting the past traveling plan as the mapless traveling plan.

Mapless traveling plan generation methods are not limited to the content described above. The traveling plan generation unit 15 may also generate the mapless traveling plan based on the host vehicle traveling environment recognized by the traveling environment recognition unit 13 in addition to the past traveling plan associated with the traveling environment classification corresponding to the traveling environment of the host vehicle and the traveling result of the past traveling plan. The traveling plan generation unit 15 generates the mapless traveling plan from the host vehicle traveling environment for a low-risk traveling result by referring to the past traveling plan and the traveling result of the past traveling plan.

When a plurality of the past traveling plans are present that are associated with the traveling environment classification corresponding to the traveling environment of the host vehicle, the traveling plan generation unit 15 generates the mapless traveling plan based on the past traveling plan with the lowest risk index among the plurality of past traveling plans. The traveling plan generation unit 15 generates the mapless traveling plan for a low-risk traveling result by referring to the past traveling plan with the lowest risk index. Alternatively, the traveling plan generation unit 15 may generate the mapless traveling plan not to approach the traveling result of a high-risk index past traveling plan by referring to the high-risk index past traveling plan as well as a low-risk past traveling plan.

When the host vehicle travels in a region corresponding to the autonomous driving map information (when the host vehicle does not travel in the map non-correspondence region), the vehicle control unit 16 executes autonomous host vehicle driving based on the traveling plan generated by the traveling plan generation unit 15. The vehicle control unit 16 executes the autonomous host vehicle driving by transmitting a control signal to the actuator 7 of the host vehicle.

The vehicle control unit 16 executes autonomous host vehicle driving based on the mapless traveling plan generated by the traveling plan generation unit 15 when the host vehicle travels in the map non-correspondence region during the autonomous driving and the traveling environment classification determination unit 14 determines that the traveling environment classification corresponding to the traveling environment of the host vehicle is present in the traveling environment classification database 5. For instance, the vehicle control unit 16 continues with the autonomous driving along the mapless traveling plan while referring to the host vehicle traveling environment recognized by the traveling environment recognition unit 13. As a result, the vehicle control unit 16 is capable of continuing with the autonomous host vehicle driving even if the host vehicle enters the map non-correspondence region during the autonomous driving.

The vehicle control unit 16 terminates the autonomous host vehicle driving when the host vehicle travels in the map non-correspondence region during the autonomous driving and the traveling environment classification determination unit 14 determines that the traveling environment classification corresponding to the host vehicle traveling environment is not present in the traveling environment classification database 5. After terminating the autonomous host vehicle driving, the vehicle control unit 16 initiates the host vehicle driving assistance or the manual driving. During the driving assistance, traveling of the host vehicle is controlled mainly by a driver. The driving assistance includes, for instance, ACC and LKA. The content of the driving assistance is not particularly limited and various known types of control can be adopted.

When the autonomous driving is terminated, the vehicle control unit 16 notifies the driver of the termination of the autonomous driving by control signal transmission to the HMI 6. The HMI 6 performs notification for the driver by audio output and/or image display.

When the traveling environment classification determination unit 14 determines that the traveling environment classification corresponding to the host vehicle traveling environment is not present in the traveling environment classification database 5, the vehicle control unit 16 may determine whether or not the host vehicle traveling environment allows the driving assistance. For instance, the vehicle control unit 16 determines that the host vehicle traveling environment allows the driving assistance when the host vehicle traveling environment corresponds to a traveling environment allowing preset driving assistance. Alternatively, the vehicle control unit 16 may determine whether or not the host vehicle traveling environment corresponds to a traveling environment not allowing preset driving assistance.

Specifically, the vehicle control unit 16 determines that the host vehicle traveling environment allows the driving assistance when the host vehicle traveling environment is a traveling environment in which the host vehicle travels straight ahead on a limited-access road. The vehicle control unit 16 determines that the host vehicle traveling environment does not allow the driving assistance when the host vehicle traveling environment is a congested environment and the driving assistance function does not correspond to the congested environment.

When it is determined that the host vehicle traveling environment allows the driving assistance, the vehicle control unit 16 terminates the autonomous driving and initiates the driving assistance. The vehicle control unit 16 terminates the autonomous driving and initiates the manual driving when it is determined that the host vehicle traveling environment does not allow the driving assistance. Still, optional is the determination by the vehicle control unit 16 on whether or not the host vehicle traveling environment allows the driving assistance. The vehicle control unit 16 may also perform switching to the driving assistance or the manual driving upon autonomous driving termination based on preset switch setting.

Data is transmitted to the traveling environment classification database 5 and recorded by the recording unit 17. The recording unit 17 transmits the data to the traveling environment classification database 5 when a preset recording condition is satisfied. The recording unit 17 determines that the recording condition is satisfied when the autonomous host vehicle driving is performed based on the mapless traveling plan. At this time, the recording unit 17 records the mapless traveling plan in the traveling environment classification database 5 as a past traveling plan regarding the traveling environment classification used for mapless traveling plan generation.

In addition, the recording unit 17 records the traveling result of the mapless traveling plan in the traveling environment classification database 5 as the traveling result of a past traveling plan. The recording unit 17 recognizes the traveling result from a change in the host vehicle traveling environment recognized by the traveling environment recognition unit 13 during the autonomous driving based on the mapless traveling plan. The recording unit 17 calculates the risk index from, for instance, the closest approach distance between the host vehicle and an obstacle during the autonomous driving based on the mapless traveling plan and records the risk index as a traveling result in the traveling environment classification database 5. Still, the risk index calculation by the recording unit 17 is optional.

Autonomous Driving Processing of Vehicle Control Device

Autonomous driving processing of the vehicle control device 100 according to this example will be described below with reference to FIG. 6. FIG. 6 is a flowchart illustrating an instance of the autonomous driving processing. The processing of the flowchart that is illustrated in FIG. 6 is executed when the autonomous host vehicle driving is initiated or the autonomous driving continues.

As illustrated in FIG. 6, in S10, the map non-correspondence region recognition unit 12 of the ECU 10 of the vehicle control device 100 determines whether or not the host vehicle travels in the map non-correspondence region. The map non-correspondence region recognition unit 12 determines whether or not the host vehicle travels in the map non-correspondence region based on the autonomous driving map information of the map database 4 and the host vehicle position on the map recognized by the vehicle position recognition unit 11.

When the map non-correspondence region recognition unit 12 determines that the host vehicle does not travel in the map non-correspondence region (S10: NO), the ECU 10 terminates the current processing. Subsequently, the ECU 10 re-initiates the determination of S10 after the elapse of a certain period of time when the autonomous driving continues. The ECU 10 proceeds to S12 when the map non-correspondence region recognition unit 12 determines that the host vehicle travels in the map non-correspondence region (S10: YES).

In S12, the traveling environment recognition unit 13 of the ECU 10 recognizes the traveling environment of the host vehicle. The traveling environment recognition unit 13 of the ECU 10 recognizes the traveling environment of the host vehicle based on the detection results of the external sensor 2 and the internal sensor 3.

In S14, the traveling environment classification determination unit 14 of the ECU 10 determines whether or not the traveling environment classification corresponding to the host vehicle traveling environment is present in the traveling environment classification database. The traveling environment classification determination unit 14 makes the above determination based on the traveling environment classification data of the traveling environment classification database 5 and the host vehicle traveling environment recognized by the traveling environment recognition unit 13. The ECU 10 proceeds to S16 when the traveling environment classification determination unit 14 determines that the traveling environment classification corresponding to the host vehicle traveling environment is present in the traveling environment classification database (S14: YES). The ECU 10 proceeds to S20 when the traveling environment classification determination unit 14 determines that the traveling environment classification corresponding to the host vehicle traveling environment is not present in the traveling environment classification database (S14: NO).

In S16, the traveling plan generation unit 15 of the ECU 10 generates the mapless traveling plan. The traveling plan generation unit 15 generates, for instance, a past traveling plan associated with the traveling environment classification corresponding to the host vehicle traveling environment as the mapless traveling plan for autonomous host vehicle driving. The traveling plan generation unit 15 generates, as the mapless traveling plan, the past traveling plan with the lowest risk index in which the risk index of the traveling result is less than the determination object threshold among the past traveling plans associated with the traveling environment classification corresponding to the host vehicle traveling environment.

In S18, the vehicle control unit 16 of the ECU 10 executes mapless traveling plan-based autonomous host vehicle driving. The vehicle control unit 16 executes the autonomous host vehicle driving by transmitting a control signal to the actuator 7 of the host vehicle along the mapless traveling plan. Subsequently, the ECU 10 repeats the processing from the determination of S10 when the autonomous driving continues.

In S20, the vehicle control unit 16 of the ECU 10 determines whether or not the host vehicle traveling environment allows the driving assistance. The vehicle control unit 16 determines that the host vehicle traveling environment allows the driving assistance when, for instance, the host vehicle traveling environment corresponds to a traveling environment allowing preset driving assistance. The ECU 10 proceeds to S22 when the vehicle control unit 16 determines that the host vehicle traveling environment allows the driving assistance (S20: YES). The ECU 10 proceeds to S24 when the vehicle control unit 16 determines that the host vehicle traveling environment does not allow the driving assistance (S20: NO)

In S22, the vehicle control unit 16 terminates the autonomous host vehicle driving and initiates the host vehicle driving assistance. In S24, the vehicle control unit 16 terminates the autonomous host vehicle driving and initiates the manual host vehicle driving.

Figure 7:
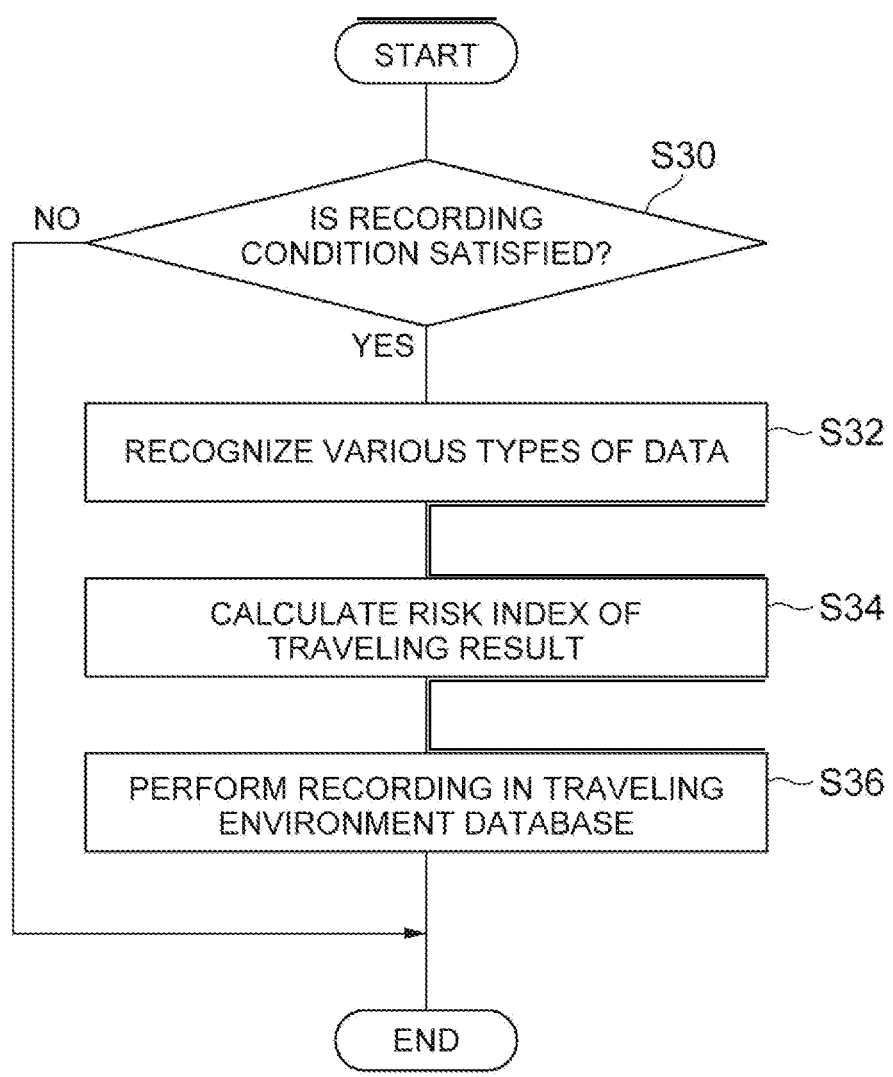
FIG. 7 is a flowchart illustrating an instance of traveling environment classification database recording processing.

Traveling Environment Classification Database Recording Processing of Vehicle Control Device Traveling environment classification database recording processing of the vehicle control device 100 according to this example will be described below with reference to FIG. 7. FIG. 7 is a flowchart illustrating an instance of the traveling environment classification database recording processing. The processing of the flowchart that is illustrated in FIG. 7 is performed during the execution of the autonomous host vehicle driving.

As illustrated in FIG. 7, in S30, the recording unit 17 of the ECU 10 of the vehicle control device 100 determines whether or not the recording condition is satisfied. The recording unit 17 determines that the recording condition is satisfied when the autonomous host vehicle driving is performed based on the mapless traveling plan. The ECU 10 terminates the current processing when the recording unit 17 determines that the recording condition is not satisfied (S30: NO). Subsequently, the ECU 10 re-initiates the determination of S30 after the elapse of a certain period of time when the autonomous driving continues. The ECU 10 proceeds to S32 when the recording unit 17 determines that the recording condition is satisfied (S30: YES).

In S32, the ECU 10 recognizes various types of data. The ECU 10 recognizes the host vehicle traveling environment during mapless traveling plan generation, the host vehicle traveling environment during mapless traveling plan-based autonomous driving execution, and the mapless traveling plan.

In S34, the recording unit 17 of the ECU 10 calculates the risk index of the traveling result. The recording unit 17 calculates the risk index from, for instance, the closest approach distance between the host vehicle and an obstacle during mapless traveling plan-based autonomous driving.

In S36, the recording unit 17 of the ECU 10 records data in the traveling environment classification database 5. The recording unit 17 records the mapless traveling plan in association as a past traveling plan with respect to the traveling environment classification corresponding to the traveling environment of the host vehicle during mapless traveling plan generation. In addition, the recording unit 17 records the traveling result (risk index) of the mapless traveling plan in association with the past traveling plan. Subsequently, the ECU 10 re-initiates the determination of S30 after the elapse of a certain period of time when the autonomous driving continues.

When the host vehicle travels in the map non-correspondence region during the autonomous driving and it is determined that the traveling environment classification corresponding to the traveling environment of the host vehicle is present in the traveling environment classification database 5, the vehicle control device 100 according to this example described above is capable of generating the mapless traveling plan based on the past traveling plan associated with the traveling environment classification and the traveling result of the past traveling plan and performing the autonomous vehicle driving based on the mapless traveling plan. Accordingly, the vehicle control device 100 is capable of appropriately executing the autonomous host vehicle driving in the map non-correspondence region to which the autonomous driving map information does not correspond by using the past traveling plan associated with the traveling environment classification corresponding to the traveling environment of the host vehicle and the traveling result of the past traveling plan.

In addition, when a plurality of the past traveling plans are present that are associated with the traveling environment classification corresponding to the traveling environment of the host vehicle, the vehicle control device 100 is capable of generating the mapless traveling plan based on the past traveling plan with the lowest risk index among the plurality of past traveling plans, and thus the vehicle control device 100 is advantageous for autonomous driving risk reduction for the host vehicle in the map non-correspondence region.

Furthermore, when the host vehicle travels in the map non-correspondence region during the autonomous driving and it is determined that the traveling environment classification corresponding to the host vehicle traveling environment is not present in the traveling environment classification database, the vehicle control device 100 is capable of terminating the autonomous driving of the host vehicle and switching to the host vehicle driving assistance or the manual driving.

In addition, the vehicle control device 100 records the mapless traveling plan and the traveling result of the mapless traveling plan in the traveling environment classification database 5 during mapless traveling plan-based autonomous host vehicle driving, and thus the traveling environment classification database 5 can be enriched.

Although a preferred example of the present disclosure has been described above, the present disclosure is not limited to the above-described example. The present disclosure can be implemented in various forms including various modifications and improvements based on the knowledge of those skilled in the art, including the above-described example.

The risk index of the traveling result of the past traveling plan may be calculated not only from the external environment of the host vehicle but also from the traveling state of the host vehicle during the execution of the autonomous driving based on the past traveling plan. The risk index may be calculated by means of at least one of parameters such as a change in the longitudinal acceleration of the host vehicle, a change in the lateral acceleration of the host vehicle, a change in the jerking of the host vehicle in the longitudinal direction (front-rear direction), a change in the jerking of the host vehicle in the lateral direction, and a change in host vehicle engine drive force. The risk index may also be calculated from the presence or absence of operation of a collision avoidance function of a pre-crash safety system or the like. A risk may be determined to be present when the collision avoidance function is operated and a risk may be determined to be absent when the collision avoidance function is not operated.

In addition, the traveling result of the past traveling plan may include the ride comfort evaluation of an occupant. The ride comfort evaluation of an occupant can be calculated from the parameters of the vehicle traveling state during the execution of the autonomous driving based on the past traveling plan as described above. The traveling plan generation unit 15 generates the mapless traveling plan by referring to the past traveling plan and the ride comfort evaluation of the past traveling plan such that the ride comfort evaluation of an occupant increases. The traveling plan generation unit 15 may be configured to generate the mapless traveling plan from a past traveling plan in which the ride comfort evaluation of an occupant is equal to or greater than a ride comfort threshold.

In addition, when a past traveling plan having the same risk index is present, the traveling plan generation unit 15 may preferentially use a past traveling plan with the minimum change in engine drive force for the mapless traveling plan and may preferentially use a past traveling plan with the minimum fuel consumption for the mapless traveling plan. Also, the traveling plan generation unit 15 may preferentially use a past traveling plan close to the preference of a driver set in advance for the mapless traveling plan.

In an alternative form, the traveling plan generation unit 15 may generate a plurality of traveling plan candidates based on the host vehicle traveling environment when the host vehicle travels in the map non-correspondence region during the autonomous driving to select, as the mapless traveling plan, the traveling plan candidate with the lowest risk from the plurality of traveling plan candidates by comparing the plurality of traveling plan candidates to the past traveling plan and the traveling result associated with the traveling environment classification corresponding to the traveling environment of the host vehicle. When a plurality of traveling plan candidates have the same risk index, the traveling plan generation unit 15 may select, as the mapless traveling plan, the traveling plan candidate in which the acceleration or the jerking of the host vehicle resulting from autonomous driving execution is equal to or less than a threshold. The acceleration may be a longitudinal acceleration or a lateral acceleration. Likewise, the jerking may be longitudinal jerking or lateral jerking. In addition, when a plurality of traveling plan candidates have the same risk index, the traveling plan generation unit 15 may select, as the mapless traveling plan, the traveling plan candidate with the minimum change in engine drive force. The traveling plan generation unit 15 may select, as the mapless traveling plan, the traveling plan candidate with the minimum fuel consumption amount.

The traveling result of the past traveling plan does not necessarily have to include the risk index. The traveling result of the past traveling plan can also be data such as the closest approach distance between the vehicle and an obstacle during past traveling plan-based autonomous driving execution. The risk index may also be calculated from the data such as the closest approach distance during the use of the traveling result of the past traveling plan. The traveling plan generation unit 15 is capable of generating the mapless traveling plan such that the host vehicle and an obstacle avoid excessive approach without using the risk index and from the past traveling plan and the traveling result of the past traveling plan (such as a time change in the relative relationship between the host vehicle and the obstacle).

The vehicle control device 100 does not necessarily have to terminate the autonomous driving when the host vehicle travels in the map non-correspondence region during the autonomous driving and the traveling environment classification determination unit 14 determines that the traveling environment classification corresponding to the host vehicle traveling environment is not present. At this time, the vehicle control device 100 may perform emergency evacuation to the shoulder of a road or the like when the driver performs no driving after situation notification for the driver via the HMI 6. In addition, the vehicle control device 100 does not necessarily have to be capable of executing the driving assistance insofar as the vehicle control device 100 is capable of switching between the autonomous driving and the manual driving.

The recording unit 17 of the vehicle control device 100 is optional. The vehicle control device 100 may simply upload host vehicle traveling plan data and host vehicle traveling environment data to a predetermined server or the like. The traveling environment classification database 5 is updated via a wireless network (such as the Internet).

The external environment included in the traveling environment of the host vehicle may be recognized based on information from a non-host vehicle around the host vehicle acquired by inter-vehicle communication as well as the detection result of the external sensor 2. The past traveling plan is not limited to a traveling plan executed in a real vehicle and a traveling plan adopted in simulation also may be adopted. At this time, not a real traveling result but a simulated traveling result is adopted concerning the traveling result of the past traveling plan as well. The past traveling plan and the traveling result of the past traveling plan may also be set data set in advance without simulation.

The traveling plan generation unit 15 may also use general map information for mapless traveling plan generation when map information less accurate than the autonomous driving map information corresponds to the map non-correspondence region in which the host vehicle travels.

The traveling environment classification determination unit 14 may determine, regardless of the risk index of the traveling result of the past traveling plan, that the traveling environment classification corresponding to the host vehicle traveling environment is present in the traveling environment classification database 5 when the past traveling plan is present that is associated with the traveling environment classification corresponding to the host vehicle traveling environment. At this time, the traveling plan generation unit 15 generates the mapless traveling plan based on the past traveling plan associated with the traveling environment classification corresponding to the host vehicle traveling environment and the traveling result of the past traveling plan. Even when only a high-risk index past traveling plan is present, the traveling environment classification determination unit 14 is capable of generating the mapless traveling plan not to approach the traveling result of the high-risk index past traveling plan by referring to the high-risk index past traveling plan.

What is claimed is:

1. A vehicle control device comprising:
a map stored in a map database, wherein the map includes autonomous driving map information used for autonomous driving of a host vehicle, wherein the autonomous driving map information includes road lane-specific positional information and target-related positional information, and the map stored in the map database includes (i) a region corresponding to the autonomous driving map information and (ii) a region designated as a map non-correspondence region that does not include at least one of the road lane-specific positional information and target-related positional information of the autonomous driving map information;
a traveling environment classification database that stores traveling environment classification data that is used for autonomous driving of the host vehicle when the host vehicle is in the region designated as the map non-correspondence region, wherein the traveling environment classification database is a different database than the map database; and
an electronic control unit (ECU) including at least one processor programmed to:
execute autonomous driving of the host vehicle based on the autonomous driving map information;
determine whether the host vehicle is traveling in the region corresponding to the autonomous driving map information or the map non-correspondence region during the autonomous driving;
based upon the determination that the host vehicle is traveling in the map non-correspondence region, recognize a traveling environment of the host vehicle based on a detection result of an in-vehicle sensor of the host vehicle;
record traveling environment classification data in which at least one past traveling plan for the autonomous driving and a traveling result of the past traveling plan are associated with each other;
determine whether or not the traveling environment classification data corresponding to the traveling environment of the host vehicle is present in the traveling environment classification database when the host vehicle travels in the map non-correspondence region during the autonomous driving;
generate a mapless traveling plan as a traveling plan of the host vehicle in the map non-correspondence region based on the past traveling plan associated with the traveling environment classification data and the traveling result of the past traveling plan when the traveling environment classification data corresponding to the traveling environment of the host vehicle is present in the traveling environment classification database; and
perform the autonomous driving of the host vehicle in the map non-correspondence region based on the mapless traveling plan.

2. The vehicle control device according to claim 1, wherein the traveling result of the past traveling plan includes a risk index, and
the ECU is further programmed to generate, when a plurality of the past traveling plans associated with the traveling environment classification corresponding to the traveling environment of the host vehicle are present, the mapless traveling plan based on the past traveling plan with a lowest risk index among the plurality of past traveling plans.

3. The vehicle control device according to claim 1, wherein the ECU is further programmed to terminate the autonomous driving of the host vehicle and initiate driving assistance or manual driving of the host vehicle when the host vehicle travels in the map non-correspondence region during the autonomous driving and the traveling environment classification corresponding to the traveling environment of the host vehicle is not present.

4. The vehicle control device according to claim 1, wherein the ECU is further programmed to record the mapless traveling plan in the traveling environment classification database as the past traveling plan concerning the traveling environment classification used for the generation of the mapless traveling plan and record a traveling result of the mapless traveling plan in the traveling environment classification database as the traveling result of the past traveling plan when the autonomous driving of the host vehicle is performed based on the mapless traveling plan.

5. The vehicle control device according to claim 2, wherein the ECU is further programmed to terminate the autonomous driving of the host vehicle and initiate driving assistance or manual driving of the host vehicle when the host vehicle travels in the map non-correspondence region during the autonomous driving and the traveling environment classification corresponding to the traveling environment of the host vehicle is not present.

6. The vehicle control device according to claim 2, wherein the ECU is further programmed to record the mapless traveling plan in the traveling environment classification database as the past traveling plan concerning the traveling environment classification used for the generation of the mapless traveling plan and record a traveling result of the mapless traveling plan in the traveling environment classification database as the traveling result of the past traveling plan when the autonomous driving of the host vehicle is performed based on the mapless traveling plan.

7. The vehicle control device according to claim 3, wherein the ECU is further programmed to record the mapless traveling plan in the traveling environment classification database as the past traveling plan concerning the traveling environment classification used for the generation of the mapless traveling plan and record a traveling result of the mapless traveling plan in the traveling environment classification database as the traveling result of the past traveling plan when the autonomous driving of the host vehicle is performed based on the mapless traveling plan.

8. The vehicle control device according to claim 5, wherein the ECU is further programmed to record the mapless traveling plan in the traveling environment classification database as the past traveling plan concerning the traveling environment classification used for the generation of the mapless traveling plan and record a traveling result of the mapless traveling plan in the traveling environment classification database as the traveling result of the past traveling plan when the autonomous driving of the host vehicle is performed based on the mapless traveling plan.

* * * * *